UNITED STATES PATENT OFFICE.

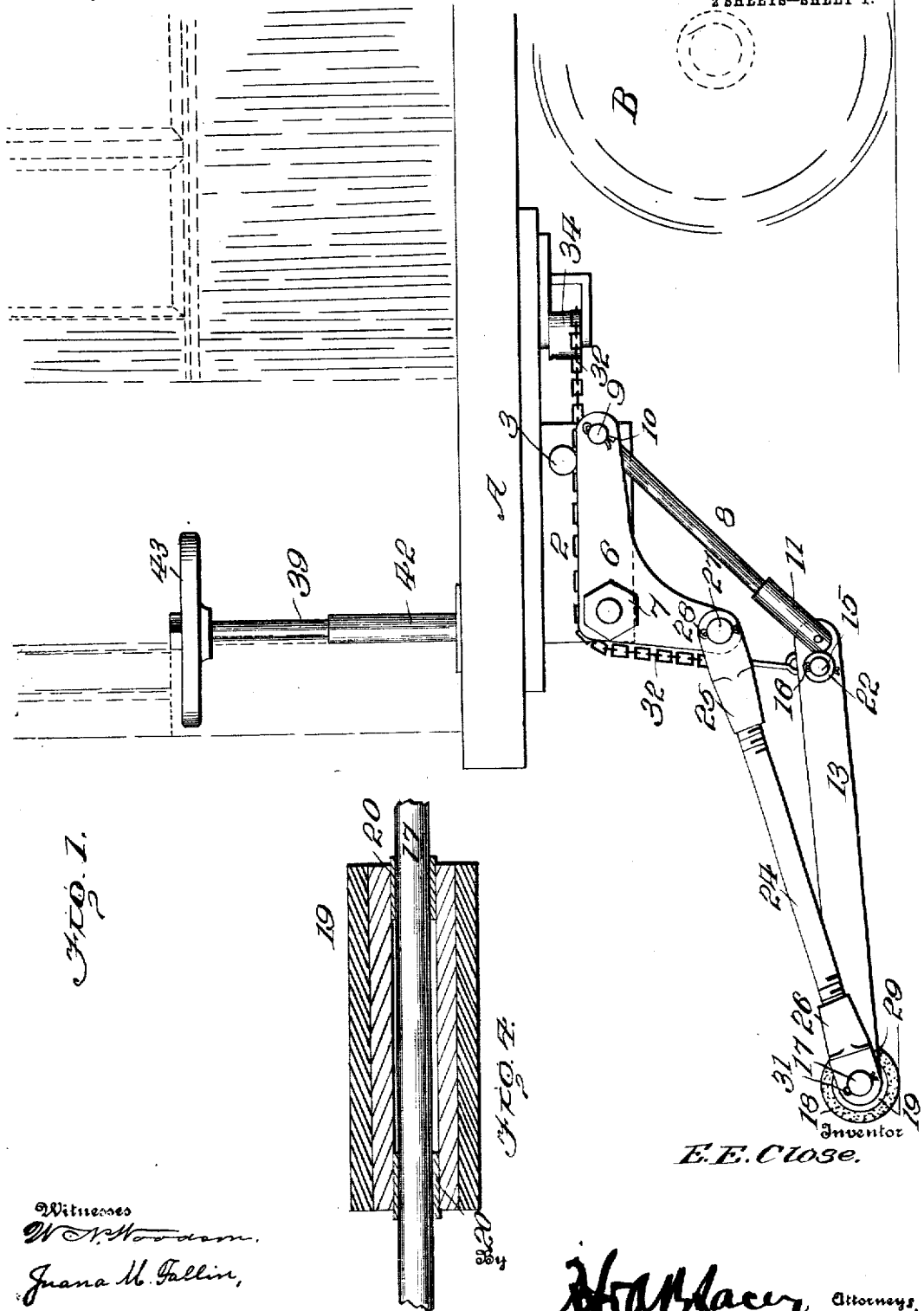

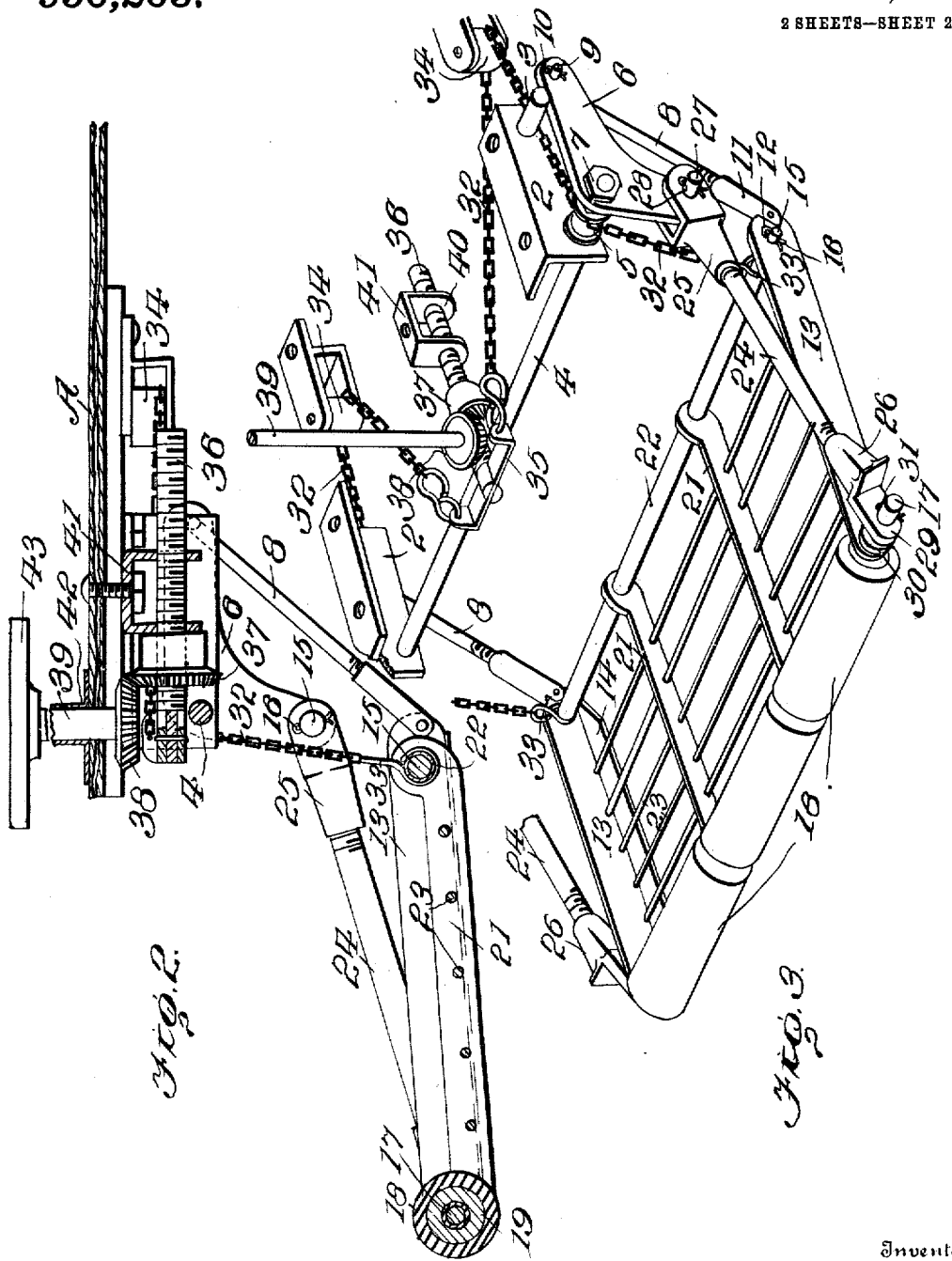

EDMUND E. CLOSE, OF BROCKTON, MASSACHUSETTS, ASSIGNOR OF ONE-THIRD TO EDWARD F. BOYD, OF BANGOR, MAINE.

CAR-FENDER.

950,203.  Specification of Letters Patent.  Patented Feb. 22, 1910.

Application filed June 24, 1909. Serial No. 504,147.

*To all whom it may concern:*

Be it known that I, EDMUND E. CLOSE, citizen of the United States, residing at Brockton, in the county of Plymouth and State of Massachusetts, have invented certain new and useful Improvements in Car-Fenders, of which the following is a specification.

My invention relates to fenders for street cars, and the object of the invention is to provide a fender which may be supported upon the extreme forward end of the car; which may be raised or lowered to any degree desired or deemed advisable by the motorman; which is provided with a platform supported from the car body so that when the fender strikes an object, the strain will be carried back to the under side of the car body, and so that the platform of the fender will not be subjected to a strain, and wherein the fender shall be more or less flexible in its nature so as to adapt itself to inequalities when lowered into a receiving position; wherein provision shall be made for forcing the fender positively beneath an object and preventing the fender from turning up when striking said object, and in which the forward end of the fender is provided with a plurality of rolls which are adapted to freely turn when striking an object and so carry the object onto the platform of the fender. These and other objects of my invention are accomplished by the construction now to be set forth and more definitely stated in the claims appended.

For a full understanding of the invention and the merits thereof, and to acquire a knowledge of the details of construction, reference is to be had to the following description and accompanying drawings, in which:

Figure 1 is a side elevation of the front end of a car with my fender applied thereto; Fig. 2 is a section of the front end of a car and the fender; Fig. 3 is a perspective view of the fender and its operating mechanism detached from the car; and Fig. 4 is a longitudinal section of one of the rolls and a fragment of the rod upon which the roll is mounted.

Corresponding and like parts are referred to in the following description and indicated in all the views of the drawings by the same reference characters.

Referring to these figures, A designates a car platform of the usual construction, and provided with the wheels B. At the forward end of the platform and on each side thereof, are the depending flanges 2 which are bolted or otherwise attached to the car platform in any desired manner and are provided at their forward ends with the bearings for a transverse shaft 4. The rear ends of the flanges are formed with the laterally projecting studs 3. The transverse shaft 4 is rotatable in its bearings and carries upon it, on the outside of each of the flanges 2, the freely rotatable sleeve 5. The extremities of the transverse shaft 4 carry the bell crank levers 6, these levers being held in position upon the transverse shaft by the set nuts 7. One arm of the bell crank lever extends downward and the other arm projects rearward beneath the laterally projecting stud 3.

Pivotally supported on the extremity of the rearwardly projecting arm of each bell crank lever 6 is downwardly and forwardly extending link 8. The upper end of this link is preferably bent at right angles, as at 9, and passes through an opening in the rear end of the bell crank lever arm. This link is held in engagement with the arm by a pin 10. The lower end of the link is screw-threaded and engages with an interiorly screw-threaded head 11 whose lower end is bifurcated as at 12 for engagement with the rear end of the side bars 13 which form the sides of the fender platform. These side bars are angular in section and have the inwardly projecting flanges 14. Passing transversely through the rear end of the side bars, is the transverse tie rod 15 which is held in place by the pins 16 passing transversely through the ends of the rod 15. The forward ends of the side bars 13 are connected to each other by a transverse rod 17 which passes through the side bars and projects out beyond the same. This tie rod supports a plurality of rollers 18. These rollers are each composed of a cylindrical metallic core 19 having thereon a sheathing of rubber, the core being provided on its interior with the collars 20 which surround the shaft or rod 17 and act as bearings for the rollers. These collars 20 project out laterally from the rollers to some extent so as to form washers between the rollers and the longitudinally extending intermediate bars 21. The bars 21 may be of any number desired, and extend from the rear transverse rod 15 to the rod 17, these rods passing through the extremities of the bars 21. Between the ends of the bars 21 and the side bars 13 are located the rollers 18, while between the rear ends of the bars 21 and the side bars are located the revoluble sleeves 22 which are freely rotatable upon the tie rod 15.

Passing through the intermediate bars 21 are the small transverse bars 23. These bars at their extremities project over upon the inwardly turned flange 14 of the side bars, but are allowed a certain freedom of movement with relation to the side bars which lends elasticity or flexibility to the fender platform, by reason of the fact that the bars 23 do not engage with or contact with the comparatively rigid angular side bars.

Connecting the downwardly extending arms of the bell crank levers with the transverse shaft 17 are the connecting rods 24. These rods are preferably screw-threaded at their ends and connected to heads 25 and 26. The head 25 is bifurcated for engagement with the downwardly turned end of the adjacent bell crank lever and pivotally connected to the bell crank lever by the transverse pin 27 held in position by the cotter pins 28. The head 26 is formed with the laterally offset flange 29 through which the shaft 17 passes, a washer 30 being interposed between the flange 29 and the face of the adjacent side bar 13, the rod or shaft 17 being held in position by the cotter pins 31. It will be seen that the connecting rod 24 is adjustable in the heads 25 and 26 so that the connection between the extremity of the fender and the bell crank levers may be shortened or lengthened as desired.

As a main means of supporting or carrying the weight of the fender platform, I provide the chains 32 which pass over the sleeves 5. The forward ends of these chains are connected to eyes 33 which are connected to the rear transverse rods 15. The other ends of the chain, after passing over the sleeves 5, pass around pulleys 34 which are mounted upon the bottom of the car or in any other suitable manner, and from these the chains pass to a yoke 35 which is attached to the forward end of the screw rod 36. This rod 36 is screw-threaded on its exterior and passes through a nut 37, this nut having the form of a bevel gear whose teeth mesh with a bevel gear 38 mounted on a shaft 39 which projects below the bottom of the car platform. The rod 36 is likewise supported in an eye 40 formed in an angle iron 41. The upper end of the shaft 39 is mounted in an upwardly extending bearing sleeve 42 and carries at its upper end the hand wheel 43.

It will be seen from this that a rotation of the shaft 39 causes a rotation of the nut 38 and a consequent advance or reverse motion of the shaft 36. This carries forward or rearward the yoke 35 and draws upon or releases the chains 32. By this means the fender platform may be moved or raised with relation to the car so that the fender as a whole may be raised or lowered to a proper distance from the road, and that the forward end of the fender platform may be raised or lowered so as to bring it into more or less adjacency to the road. Thus, in city districts, the forward end of the fender platform may be lowered to a degree of closeness to the road bed depending upon the chance of accidents, and in the country districts where there are liable to be stones or other roughness in the road bed, the forward end may be raised a proper degree to escape these impediments. When it is desired of course to fold the fender platform up against the dashboard of the car, it is only necessary to turn the hand wheel 43 to an extent sufficient to force the screw rod 36 outward to its full extent, which will draw the platform up until it is practically at right angles to the car platform.

The advantages of the invention are obvious from what has gone before, but it may be also stated that one of the main advantages of the construction is that the connecting rods 24 brace the forward end of the fender against shock, and prevent the forward end from turning up when it strikes an obstruction, as for instance, a person who has fallen in front of the car. Thus, there is no danger of the fender escaping the person, but instead, these connecting rods positively act to force the fender beneath the body of the person, and the rollers 18 act to permit the person to roll easily onto the body of the fender or fender platform. Even where one of the rollers happens to be in contact with the ground, yet others of the rollers will be free and will turn upon contact with the object being lifted by the fender and will act to roll the object upon the fender platform. Another important advantage lies in the fact that all strain upon the fender is translated into an upward pressure against the bottom of the car, and thus is resisted by the whole weight of the body of the car. This is secured by the use of the bell crank levers which are attached to the connecting rods, and by the fact that these bell crank levers are connected to both the rear and the front ends of the fender platform. This downward weight of the fender, or the force of the shock against the fender acts to rotate the bell crank levers so as to bring their rearwardly projecting arms against the studs 3. Practically the entire weight of the fender platform, under normal circumstances, is supported by the chains 32. Thus, there is very little strain upon the bolts or other means for attaching the fender to the car.

This fender is light, cheap to build, and very easy to repair. It can be attached to the extreme end of any car without making any substantial changes therein, and will not interfere with any of the other apparatus or working parts of the car. At the same time, the construction is such that it secures a full depth for the fender. On many fenders now constructed there is not room for a person to remain on the fender platform after it has struck him and he has fallen thereon. By using a plurality of short rolls covered with rubber, I am enabled to use the two intermediate bars and braces for the shaft which carries the rolls, thus taking the strain from the roller shaft and preventing this shaft from buckling when the rolls strike an object. By my construction too, the rolls if damaged may be cheaply and easily removed and replaced. Further than this, the construction of my fender platform provides for a degree of flexibility therein which is very necessary, as the rolls run very near to the ground, and when a roll on one side strikes a high place in the road bed, it lifts easily and quickly and does not rack and strain the platform. The forward end of the fender platform can be raised or lowered by the motorman while the car is in motion, and may be held to any adjusted position. This is a great advantage, as if the car is running through a thickly settled district, the forward end of the fender may be lowered as near to the road as desired, while in the suburbs, the rolls may be raised to clear obstructions. Further, there is no strain upon the fender platform when the rolls strike an object. The platform is merely suspended from the hanger shaft or rod 4 by the chains, and the strain is transmitted from the roller shaft to the rear transverse rod 15 from which the side links transmit it to the body of the car. One other special advantage is the fact that the platform is independently adjustable with relation to the adjusting wheel and shaft 39 and 43. This adjusting wheel is for the purpose of raising and lowering the platform to what may be called a permanently adjusted position, but the platform may also be raised up against the dashboard of the car without operating the adjusting shaft and wheel, and then may be held in this position by any locking devices.

Having thus described the invention, what is claimed as new is:—

1. The combination with a street car, of a fender platform freely suspended therefrom, links connected to the front and rear ends of the fender platform and extending upward and rearward, and pivoted connections between said links and the car platform, whereby a rearward movement of the fender platform is translated into an upward movement against the bottom of the car platform.

2. The combination with a street car platform, of a fender platform projecting forward of the car platform, forwardly projecting links pivotally connected to the car platform and supporting the forward end of the fender platform, links pivotally connected to the car platform and supporting the rearward end of the fender platform, flexible connections attached to and supporting the rear end of the fender platform, and means for drawing upon or releasing said flexible connections to raise or lower the forward end of the platform.

3. The combination with a street car, of a fender platform pivotally supported from the car for a rearwardly swinging movement, a flexible connection attached to the fender platform forward of its pivotal connection, and means mounted on the car platform for raising or lowering the pivotal connection to raise or lower the fender platform.

4. The combination with a street car, of a fender platform, bell crank levers mounted on opposite sides of the car, links connecting the ends of the bell crank levers to the front and rear ends respectively of the fender platform, means for turning the fender platform upon its pivotal connection with the rearmost links, and stops engaging with the bell crank levers.

5. The combination with a car platform, of a fender platform, links pivoted to the car platform and fender platform, permitting the fender platform to have a rearward and upward movement, stops for limiting the rearward movement of the fender platform, and means for rotating the fender platform and links to raise the fender platform into a vertical plane.

6. The combination with a car platform of a fender platform, links for supporting the forward and rear ends of the fender platform, supporting means on the car with which the rear ends of the links are pivotally connected, and connections for raising the fender platform to a vertical position connected at one end to elevating mechanism on a car and at the other end connected to the fender platform forward of its pivotal engagement with the links.

7. The combination with a car, of opposed bell crank levers pivotally supported on the car, one arm of each of the bell cranks extending rearward and the other downward, stops on the car against which the rearwardly extending arms contact, a fender platform, links connecting the rearwardly extending arms of the bell crank levers with the rear end of the fender platform, links pivoted to the downwardly extending arms of the bell crank levers and pivotally connected to the front platform, and means on the car for turning the platform into a vertical position.

8. The combination with a car platform, of opposed bell crank levers on either side thereof, one arm of each lever extending rearward and the other downward, stops on the car platform against which the rearwardly extending arms contact, links pivoted to the rear end of the fender platform and extending upward and rearward to the rearwardly extending arms of the bell crank levers, links pivoted to the downwardly extending ends of the bell cranks and pivoted to the forward end of the fender platform, flexible connections attached to the fender platform forward of its pivotal engagement with the rearmost links, and mechanism on the car for drawing upon said flexible connections, thereby raising the fender platform to a vertical position.

9. The combination with a car platform, of opposed bell crank levers mounted on the under side thereof, each of said levers having a rearwardly extending arm and a downwardly extending arm, stops on the car platform against which the rearwardly extending arms contact, a fender platform, a link pivoted to each side of the rear end of the fender platform and pivotally attached to the rearwardly extending arm of the adjacent bell crank lever, flexible connections attached to the rear end of the fender platform forward of its pivotal connection with the rearmost links, pulley wheels supported from the car platform over which said flexible connections pass, a longitudinally shiftable yoke to which the flexible connections are connected at one end, and means for moving said yoke in either direction to draw upon or release the flexible connections and raise or lower the fender platform.

10. The combination with a car, of members pivoted to each side of the car and depending below the same, a fender platform, links supporting the fender platform from the pivoted members, means for raising or lowering the forward end of the fender platform, and means for rotating said pivoted members and raising the fender platform into a vertical position.

11. The combination with a car, of supports pivotally mounted upon the car, a fender platform pivotally connected to said supports, means for permitting the fender platform to move with relation to said supports and permit the forward end of the platform to be vertically adjusted, and means permitting a rotatable movement of the fender platform and the supports to permit the fender platform to be raised into an inoperative position.

12. The combination with a car, of a fender platform, depending platform supports pivotally mounted on the car, links connecting the forward and rear ends of the fender platform with said depending supports, said platform being pivoted to the links, and means for turning the platform relative to the links to adjust the forward end thereof and for turning the platform and supports as a whole to raise the fender platform into an inoperative position.

13. The combination with a car, of bell crank levers mounted on either side thereof, pulleys mounted in alinement with the pivotal axis of the bell crank levers, stops with which the rearwardly extending ends of the bell crank levers engage, a fender platform, downwardly and forwardly extending links pivotally connected at their upper ends to the rearwardly extending arms of the bell crank levers, said fender platform being pivotally connected to said links at its rear end, links connecting the downwardly extending arms of the bell crank levers with the forward end of the fender platform, flexible connections passing over the said pulleys and connected to the fender platform forward of its point of pivotal engagement with the rear links, and means on the car platform for drawing upon and releasing said flexible connections to raise or lower the forward end of the fender platform.

14. In a car fender, a fender platform having opposed side bars, each having an inwardly extending flange, tie rods connecting the side bars at their forward and rear ends, intermediate forwardly extending bars, transverse cross bars supported on the intermediate bars and extending over but not engaging with the inwardly turned flanges of the side bars, rotatable sleeves mounted on the rearmost tie bar and located between the intermediate cross bars and the side bars, and rollers mounted on the forward tie rod, said rollers being located between the intermediate bars and the side bars.

15. The combination with a car platform, of depending fender supports, each pivotally mounted between its ends on the car platform, links on opposite ends of each of the pivoted supports, one of said links extending to the forward end of the fender platform and the other to the rear end thereof, a flexible connection attached to the rear end of the fender platform, forward of the attachment of the rearward links, and means for drawing upon or releasing said flexible connections.

16. The combination with a car platform and supports each pivoted between its ends to the car platform at the sides thereof, of a fender platform comprising side bars, a plurality of intermediate bars, a plurality of transversely extending bars attached to the intermediate bars and supported on the side bars, links connecting the opposite ends of the pivoted supports on the car to the opposite ends of the fender platform, rotatable sleeves mounted on the car platform, flexible connections passing over said sleeves and attached to the rear of the car platform, forward of its pivotal attachment to the rearmost links, and means for drawing upon or releasing said flexible connections.

17. In a car fender, the combination of a fender platform with opposed angular side bars having inwardly extending lower flanges, a tie bar connecting the forward end of the side bars, rollers mounted on said tie bars and forming the forward edge of the fender platform, a plurality of intermediate, forwardly extending bars, and transverse cross bars passing through the intermediate bars and having their free ends loosely resting upon the flanges of the side bars.

18. The combination with a car platform, of bell crank levers mounted on the sides thereof, having each a rearward and a downwardly extending arm, stops against which the rearwardly extending arms engage, pulleys supported from the car platform in alinement with the axis of the bell crank levers, a fender platform, links connecting the rear end of the fender platform at opposite sides with the rearwardly extending ends of the bell crank levers, links connecting the forward end of the fender platform at opposite sides with the downwardly extending arms of the bell crank levers, flexible connections attached to the fender platform, forward of its point of pivotal engagement with the rearmost links, said flexible connections passing over the pulleys, pulleys located rearward of the bell crank levers, over which said flexible connections pass, a yoke to which the ends of the connections are attached, a longitudinally movable rod upon which the yoke is mounted, a hand operable shaft, and connections between said shaft and rod whereby when the shaft is rotated the rod will be moved in one or the other direction to draw upon or release the flexible connections to raise or lower the forward end of the fender platform.

19. The combination with a car, of downwardly extending flanges mounted on the bottom of the car, a transverse rod carried by said flanges, loose pulleys on the transverse rod, bell crank levers on the ends of the transverse rod beyond said pulleys each of said levers having a rearwardly extending arm and a downwardly extending arm, laterally projecting studs with which said rearwardly extending arm of the bell crank lever engages, a fender platform, links connecting the rear ends of the fender platform at opposite sides of the bell crank levers, links connecting the downwardly extending ends of the bell crank levers with the forward end of the fender platform rearward of the first named pulleys, chains connected to the rear end of the fender platform forward of its point of attachment to the rearmost links, said chains passing over the first named pulleys and around the last named pulleys, a yoke to which the chains are connected, a longitudinally movable screwthreaded rod upon which the yoke is mounted, a nut on said rod having bevel gear teeth, a vertical shaft on the car platform, and a bevel gear mounted on the end of the shaft and engaging with the teeth of said nut.

In testimony whereof I affix my signature in presence of two witnesses.

EDMUND E. CLOSE. [L. S.]

Witnesses:
CALVIN KNAID,
E. K. BAKER.